(12) United States Patent
Kim et al.

(10) Patent No.: US 9,420,575 B2
(45) Date of Patent: Aug. 16, 2016

(54) METHOD FOR SEARCHING CONTROL SIGNAL IN A WIRELESS ACCESS SYSTEM SUPPORTING CARRIER AGGREGATION (CA)

(75) Inventors: Soyeon Kim, Anyang-si (KR); Jaehoon Chung, Anyang-si (KR); Sungho Moon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 13/702,951

(22) PCT Filed: May 6, 2011

(86) PCT No.: PCT/KR2011/003391
§ 371 (c)(1),
(2), (4) Date: Dec. 7, 2012

(87) PCT Pub. No.: WO2011/155708
PCT Pub. Date: Dec. 15, 2011

(65) Prior Publication Data
US 2013/0088972 A1 Apr. 11, 2013

Related U.S. Application Data

(60) Provisional application No. 61/352,389, filed on Jun. 8, 2010, provisional application No. 61/372,475, filed on Aug. 11, 2010, provisional application No. 61/358,377, filed on Jun. 24, 2010, provisional application No. 61/360,441, filed on Jun. 30, 2010.

(51) Int. Cl.
*H04W 72/04* (2009.01)
*H04L 5/00* (2006.01)
*H04L 27/26* (2006.01)

(52) U.S. Cl.
CPC ............. *H04W 72/042* (2013.01); *H04L 5/001* (2013.01); *H04L 5/0032* (2013.01); *H04L 27/2647* (2013.01)

(58) Field of Classification Search
CPC ........... H04W 72/0406; H04W 72/042; H04L 5/001; H04L 5/0032; H04L 27/2647
USPC ........................................ 370/252, 328, 329
See application file for complete search history.

(56) References Cited

U.S. PATENT DOCUMENTS

2005/0141656 A1  6/2005 Choi
2009/0088148 A1  4/2009 Chung et al.
(Continued)

FOREIGN PATENT DOCUMENTS

CN          101478808 A    7/2009
JP          2012-525803 A  10/2012
(Continued)

OTHER PUBLICATIONS

Huawei et al., "Search spaces on one CC for the cross-CC scheduling," 3GPP TSG RAN WG1 meeting #61, Montreal, Canada, May 10-14, 2010, R1-103083, 8 pages.
(Continued)

*Primary Examiner* — Christopher Grey
(74) *Attorney, Agent, or Firm* — Birch, Stewart, Kolasch & Birch, LLP

(57) ABSTRACT

The present invention relates to a wireless access system supporting carrier aggregation and carrier aggregation technology, and discloses methods for effectively detecting control signals for a plurality of cells and apparatuses supporting same. In an embodiment of the present invention, a method for detecting control signals in a wireless access system supporting multiple carrier aggregation (CA) and cross carrier scheduling may comprise calculating the start point of a reference search space in an expanded search space, calculating start points of the next search spaces which are spaced apart from the reference search space by a predetermined offset value, and performing blind decoding on the reference search space and subsequent search spaces to search control signals from a base station.

8 Claims, 11 Drawing Sheets

(56) References Cited

U.S. PATENT DOCUMENTS

| | | | |
|---|---|---|---|
| 2010/0254268 A1* | 10/2010 | Kim et al. | 370/241 |
| 2010/0303011 A1* | 12/2010 | Pan | H04L 5/001 370/328 |
| 2011/0110316 A1 | 5/2011 | Chen et al. | |
| 2011/0228724 A1* | 9/2011 | Gaal et al. | 370/328 |
| 2012/0263052 A1 | 10/2012 | Dai et al. | |
| 2013/0201921 A1* | 8/2013 | Chen et al. | 370/329 |
| 2014/0293935 A1 | 10/2014 | Nishio et al. | |

FOREIGN PATENT DOCUMENTS

| | | |
|---|---|---|
| KR | 2005-160082 A | 6/2005 |
| KR | 10-2006-0028611 A | 3/2006 |
| KR | 10-2007-0069930 A | 7/2007 |
| WO | WO 2010/050234 A1 | 5/2010 |
| WO | WO 2010/149106 A1 | 12/2010 |

OTHER PUBLICATIONS

Qualcomm incorporated, "Search space and blind decodes for CA", 3GPP TSG RAN WG1 #61 R1-102741, May 10-14, 2010, pp. 1-4.

Zte, "PDCCH blind decoding and search space for carrier aggregation of LTE-A", 3GPP TSG-RAN WG1 #61 R1-102892, May 10-14, 2010.

LG Electronics, "Per-CC UE-specific Search Space Configuration Methods for Cross-Carrier Scheduling", 3GPP TSG RAN WG1 #60bis, R1-102318, Apr. 12-16, 2010, pp. 1-3.

Qualcomm Incorporated, "PDCCH for CA: monitoring set, search space and blind decodes", 3GPP TSG RAN WG1 #60bis, R1-102318, Apr. 12-16, 2010, pp. 1-3

Research in Motion, UK Limited, "Blind Decoding and Search Space for Carrier Aggregation", 3GPP TGS RAN WG1 Meeting #61, R1-103064, May 10-14, 2010, pp. 1-6.

Samsung, "PDCCH Search Space Design for CA", 3GPP TSG RAN WG1 #61, R1-102996, May 10-14, 2010, pp. 1-5.

* cited by examiner

METHOD FOR SEARCHING CONTROL SIGNAL IN A WIRELESS ACCESS SYSTEM SUPPORTING CARRIER AGGREGATION (CA)

CROSS REFERENCE TO RELATED APPLICATIONS

This application is the National Phase of PCT/KR2011/003391 filed on May 6, 2011, which claims priority under 35 U.S.C. §119(e) to U.S. Provisional Application Nos. 61/352,389 filed on Jun. 8, 2010, 61/358,377 filed on Jun. 24, 2010, 61/360,441 filed on Jun. 30, 2010, and 61/372,475 filed on Aug. 11, 2010, all of which are hereby expressly incorporated by reference into the present application.

TECHNICAL FIELD

The present invention relates to a wireless access system that supports carrier aggregation technology, and methods for effectively detecting control signals of a plurality of cells and an apparatus supporting the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

A 3rd Generation Partnership Project (3GPP) Long Term Evolution (LTE) Rel-8 system (hereinafter, referred to as LTE system) uses a multi-carrier modulation (MCM) scheme that divides a single component carrier (CC) into several bands. However, in a 3GPP LTE-Advanced system (hereinafter, referred to as LTE-A system), a method such as carrier aggregation that uses one or more component carriers in combination may be used to support a system bandwidth broader than that of the LTE system.

In the LTE system, a PDCCH signal and a PDSCH signal are transmitted through one component carrier (CC) on the basis of DL/UL single carrier. The component carrier (CC) through which the PDCCH signal and a PUSCH signal are transmitted is fixed in accordance with DL-UL linkage.

If the carrier aggregation technology is supported and cross-carrier scheduling is used in the same manner as the LTE-A system, since a plurality of PDCCHs may be transmitted to a specific user equipment through one DL CC, a problem occurs in that a plurality of PDCCHs cannot be scheduled by a candidate PDCCH defined in the LTE system.

Also, in case of the LTE system, flexibility may be deteriorated in scheduling the plurality of PDCCHs, and PDCCH blocking probability may be increased. This is because that PDCCHs more than those of the existing LTE Rel-8 system should be transmitted within a search space configured by a limited number of candidate PDCCHs.

Moreover, in the case that a carrier having no PDCCH signal exists for interference coordination in a multi-cell environment such as heterogeneous networks, or in the case that a carrier that may transmit control channels is limited on carrier configuration of a random cell, a plurality of PDCCHs may be concentrated on a specific DL CC. For this reason, resources included in a control region may cause the quantity of the limited search space to be insufficient in view of absolute resources.

An object of the present invention devised to solve the conventional problems is to provide to a method for efficiently transmitting and receiving control information and an apparatus supporting the same.

Another object of the present invention is to provide a method for configuring a search space for transmitting and receiving control information in an LTE-A system.

Other object of the present invention is to provide a method for effectively searching for a plurality of kinds of control information from a random carrier or service cell if cross carrier scheduling is used.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, as embodied and broadly described herein, the present invention relates to a wireless access system that supports carrier aggregation technology, and discloses methods for effectively searching for control signals of a plurality of cells and apparatuses supporting the same.

According to one embodiment of the present invention, a method for detecting a control signal in a wireless access system, which supports multiple carrier aggregation (CA) and cross carrier scheduling, comprises calculating a starting point of a reference search space in an extended search space; calculating starting points of subsequent search spaces which are spaced apart from the reference search space by a predetermined offset value; and performing blind decoding in the reference search space and the subsequent search spaces to search for the control signal from a base station.

In another aspect of the present invention, a user equipment for detecting a control signal from a base station in a wireless access system, which supports multiple carrier aggregation (CA) and cross carrier scheduling, comprises a transmission module for transmitting a radio signal; a reception module for receiving the radio signal; and a processor for searching for the control signal.

In this case, the processor may calculate a starting point of a reference search space in an extended search space, calculate starting points of subsequent search spaces which are spaced apart from the reference search space by a predetermined offset value, and perform blind decoding in the reference search space and the subsequent search spaces to search for the control signal from a base station.

In the aspects of the present invention, the reference search space may be configured by one of a primary component carrier (PCC), an anchor component carrier and a self-scheduling component carrier.

In the aspects of the present invention, the offset value is preferably one of a carrier index (CI), a carrier indicator field (CIF) and a function of carrier index (f(CI)).

In the aspects of the present invention, the subsequent search spaces are configured consecutively with the reference search space.

In the aspects of the present invention, the reference search space and the subsequent search spaces are calculated by $L \cdot \{(Y_k+m+M^{(L)} \cdot n_{CI\_CC\#p}+O_{CC\#p}) \mod \lfloor N_{CCE,k}/L \rfloor\}+i$, $M^{(L)}$ represents the number of PDCCH candidates which will be monitored by the corresponding search space, and $n_{CI\_CC\#p}$ is a carrier index and represents the offset value.

The aforementioned embodiments of the present invention are only a part of the preferred embodiments of the present invention, and various embodiments in which technical features of the present invention are reflected may be devised and understood based on the detailed description of the present invention, which will be described later, by the person with ordinary skill in the art.

Advantageous Effects

According to the embodiments of the present invention, the following advantages may be obtained.

First of all, control information may efficiently be transmitted and received in the LTE-A system where the LTE user equipment and the LTE-A user equipment coexist.

Second, the search space that may be used in the LTE-A system may be provided differently from the search space provided in the LTE system.

Third, if cross carrier scheduling is used, the LTE-A user equipment may effectively search for a plurality of kinds of control information from a random carrier or serving cell.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
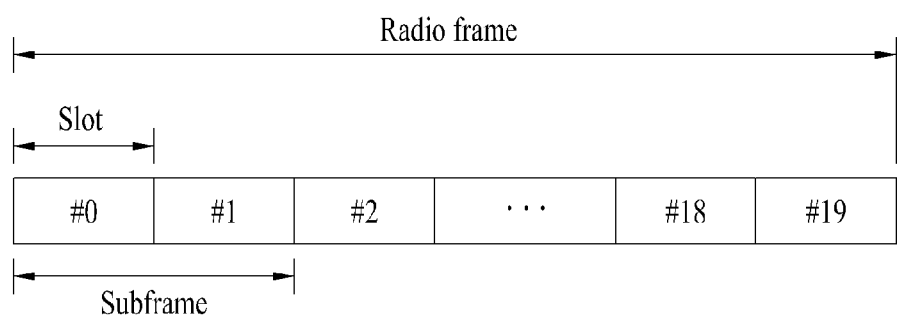
FIG. 1 is a diagram illustrating a structure of a radio frame that may be used in the embodiments of the present invention.

The embodiments of the present invention relate to various methods for transmitting and receiving contention based uplink channel signals and apparatuses supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the base station (BS) may be replaced with terms such as a fixed station, Node B, eNode B (eNB), an advanced base station (ABS) and an access point (AP).

Also, a terminal may be replaced with terms such as a user equipment (UE), a mobile station (MS), or a subscriber station (SS) a mobile subscriber station (MSS), a mobile terminal and an advanced mobile station (AMS).

Furthermore, a transmitting side means a fixed or mobile node that transmits data services or voice services while a receiving side means a fixed or mobile node that receives data services or voice services. Accordingly, in an uplink, the mobile station could be a transmitting side while the base station could be a receiving side. Likewise, in a downlink, the mobile station could be a receiving side while the base station could be a transmitting side.

The embodiments of the present invention may be supported by standard documents disclosed in at least one of wireless access systems, i.e., IEEE 802 system, 3GPP system, 3GPP LTE system, and 3GPP2 system. Particularly, the embodiments of the present invention may be supported by one or more of documents of 3GPP TS 36.211, 3GPP TS 36.212, 3GPP TS 36.213, and 3GPP TS 36.321. Namely, among the embodiments of the present invention, steps or parts which are not described to clarify the technical features of the present invention may be supported by the above standard documents. Also, all terminologies disclosed herein may be described by the above standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Also, specific terminologies hereinafter used in the embodiments of the present invention are provided to assist understanding of the present invention, and various modifications may be made in the specific terminologies within the range that they do not depart from technical spirits of the present invention.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access).

The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA).

The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. Although the following description will be based on the 3GPP LTE/LTE-A to clarify description of technical features, it is to be understood that the present invention may be applied to the IEEE 802.16e/m system.

1. Basic Structure of 3GPP LTE/LTE-A System

FIG. 1 is a diagram illustrating a structure of a radio frame that may be used in the embodiments of the present invention.

A radio frame includes 10 subframes, each of which includes two slots. The time required to transmit one subframe will be defined as a transmission time interval (TTI). At this time, one subframe has a length of 1ms, and one slot has a length of 0.5 ms.

One slot includes a plurality of orthogonal frequency division multiplexing (OFDM) symbols in the time domain and a plurality of resource blocks (RBs) in a frequency domain. The OFDM symbols represent one symbol period in the 3GPP LTE system that uses an orthogonal frequency division multiplexing access (OFDMA) scheme in a downlink Namely, the OFDM symbols may be referred to as SC-FDMA symbols or symbol duration depending on multiple access system. A resource block (RB) is a resource allocation unit, and includes a plurality of continuous subcarriers in one slot.

The structure of the radio frame in FIG. 1 is only exemplary, and various modifications may be made in the number of subframes included in the radio frame, the number of slots included in one subframe, or the number of OFDM symbols included in one slot.

Figure 2:
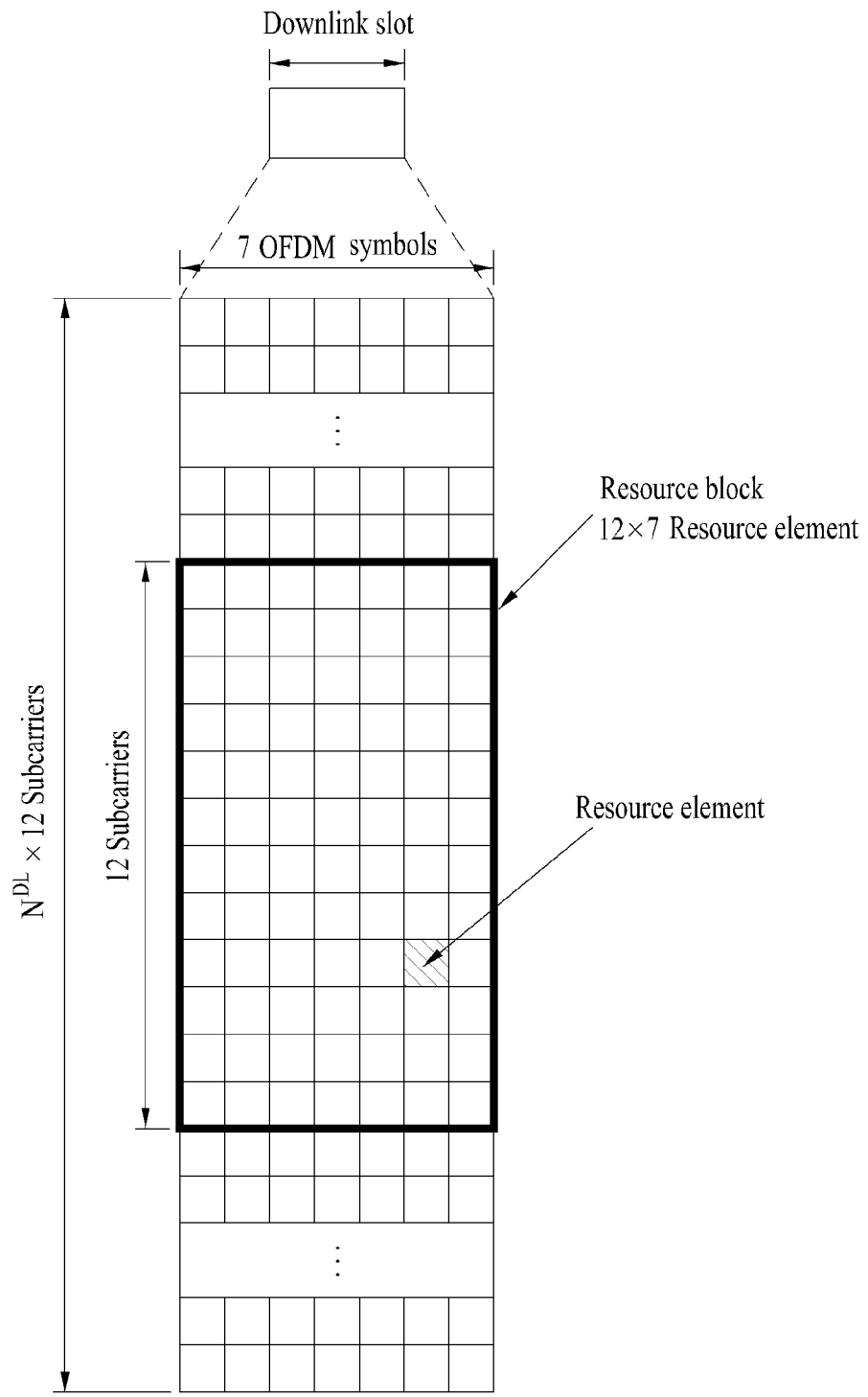
FIG. 2 is a diagram illustrating a resource grid of one downlink slot that may be used in the embodiments of the present invention.

FIG. 2 is a diagram illustrating a resource grid for one downlink slot that may be used in the embodiments of the present invention.

The downlink slot includes a plurality of OFDM symbols in a time domain. In an example of FIG. 2, one downlink slot includes seven OFDM symbols, and one resource block includes 12 subcarriers in a frequency domain.

Each element on a resource grid will be referred to as a resource element (RE). One resource block (RB) includes 12×7 resource elements (REs). The number $N^{DL}$ of resource blocks included in the downlink slot is subjected to a downlink transmission bandwidth set in a cell.

Figure 3:
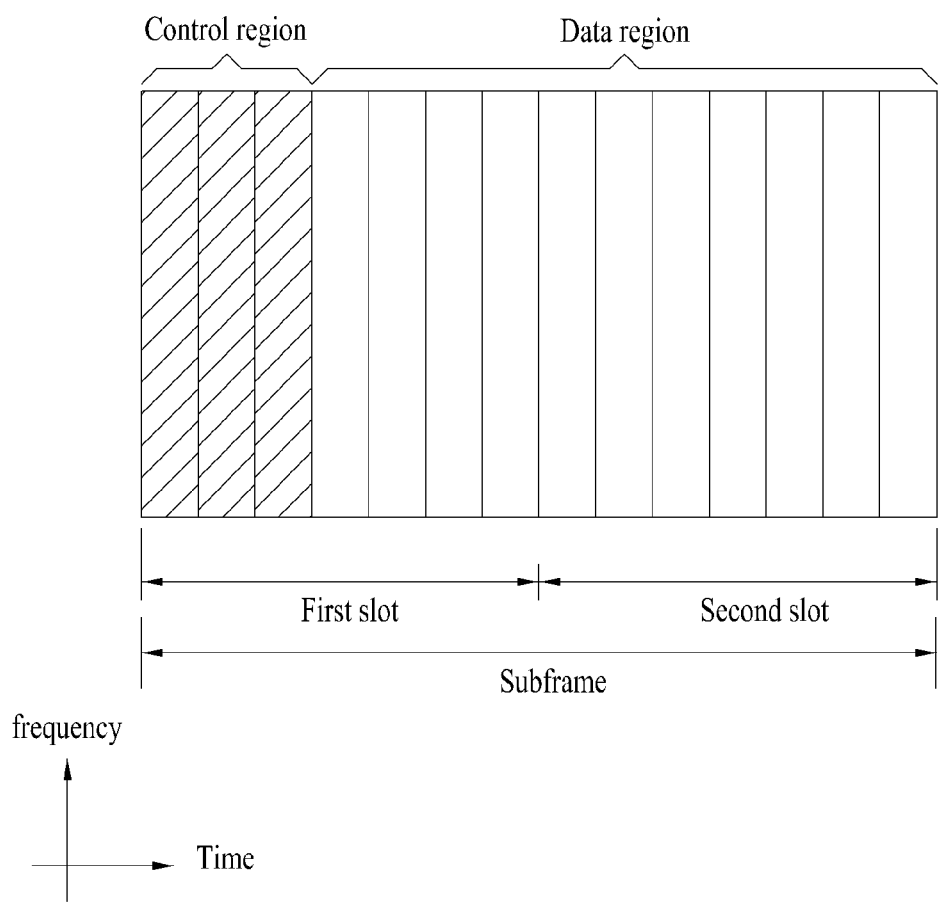
FIG. 3 is a diagram illustrating a structure of a downlink subframe that may be used in the embodiments of the present invention.

FIG. 3 is a diagram illustrating a structure of a downlink subframe that may be used in the embodiments of the present invention.

The downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH signal transmitted from the first OFDM symbol of the subframe carries information on the number (that is, size of control region) of OFDM symbols used for transmission of the control channel signals within the subframe. The PHICH carries ACK/NACK (acknowledgement/none-acknowledgement) signal in response to uplink HARQ (Hybrid Automatic Repeat Request). In other words, the ACK/NACK signal for the uplink data transmitted from the user equipment is transmitted onto the PHICH.

The control information transmitted through the PDCCH will be referred to as downlink control information (DCI). The DCI includes resource allocation information for user equipment or user equipment group and other control information. For example, the DCI may include uplink resource allocation information, downlink resource allocation information and uplink transmission power control command.

The PDCCH may carry transport format and resource allocation information of a downlink shared channel (DL-SCH), transport format and resource allocation information of an uplink shared channel (UL-SCH), paging information on a paging channel (PCH), system information on the DL-SCH, resource allocation information of higher layer control message such as random access response transmitted on the PDSCH, a set of transmission power control commands of individual user equipments (UEs) within a random user equipment group, transmission power control command, and activity information of voice over Internet protocol (VoIP).

A plurality of PDCCHs may be transmitted from one control region. The user equipment may monitor the plurality of PDCCHs. The PDCCH may be transmitted on one or more continuous control channel elements (CCEs). The CCE is a logic allocation resource used to provide the PDCCH at a single coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI to be transmitted to the user equipment, and attaches cyclic redundancy check (CRC) to the control information.

The CRC is masked with an identifier (for example, radio network temporary identifier (RNTI)) depending on usage of the PDCCH or owner of the PDCCH. If the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. Also, if the PDCCH is for system information (in more detail, system information block (SIB)), a system information identifier and system information RNTI (S-RNTI) may be masked with the CRC. In order to indicate a random access response which is the response to reception of a random access preamble of the user equipment, a random access RNTI (RA-RNTI) may be masked with the CRC.

The PDCCH may be transmitted through one or more component carriers in a carrier aggregation environment, and may include resource allocation information on one or more component carriers. For example, although the PDCCH is transmitted through one component carrier, it may include resource allocation information on one or more PDSCHs and PUSCHs.

Figure 4:
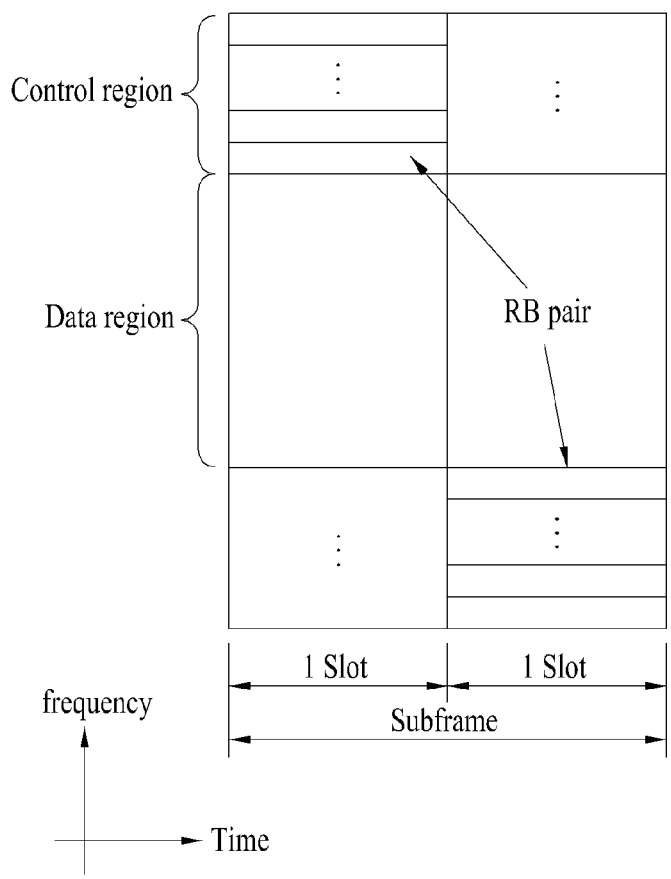
FIG. 4 is a diagram illustrating a structure of an uplink subframe that may be used in the embodiments of the present invention.

FIG. 4 is a diagram illustrating an example of a structure of an uplink subframe that may be used in the embodiments of the present invention.

Referring to FIG. 4, the uplink subframe includes a plurality of slots (for example, two slots). The slot may include a number of SC-FDMA symbols different from the number of SC-FDMA symbols of the other slot. The uplink subframe may be divided into a control region and a data region on a frequency domain. The data region includes a physical uplink shared channel (PUSCH), and is used to transmit a data signal that includes voice information. The control region includes a physical uplink control channel (PUCCH), and is used to transmit uplink control information (UCI). The PUCCH includes RB pair located at both ends of the data region on the frequency axis and performs hopping at a slot boundary.

In the LTE system, in order to maintain single carrier features, the user equipment does not transmit the PUCCH signal and the PUSCH signal at the same time. However, in the LTE-A system, the PUCCH signal and the PUSCH signal may be transmitted for the same subframe at the same time depending on a transmission mode of the user equipment through piggyback of the PUCCH signal to the PUSCH signal.

The PUCCH for one user equipment is allocated to resource block (RB) pair for one subframe. Resource blocks (RBs) belonging to the RB pair occupy different subcarriers for two slots. It means that the RB pair allocated to the PUCCH is subjected to frequency hopping at a slot boundary.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to the PDCCH indicating release of semi-persistent scheduling (SPS) or the downlink data packet on the PDSCH. It represents whether the downlink data packet or the PDCCH indicating SPS release has been successfully received. ACK/NACK 1 bit is transmitted in response to a single downlink codeword, and ACK/NACK 2 bits are transmitted in response to two downlink codewords. In case of TDD, ACK/NACK responses for a plurality of downlink subframes are collected and transmitted from one PUCCH through bundling or multiplexing.

CQI (Channel Quality Indicator) or CSI (Channel State Information): is feedback information on a downlink channel. MIMO (Multiple Input Multiple Output) related feedback information includes a rank indicator (RI) and a precoding matrix indicator (PMI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation of UCI and PUCCH format in the LTE system.

TABLE 1

| pUCCH format | UCI |
| --- | --- |
| Format 1 | Scheduling request (SR) |
| Format 1a | 1 bit HARQ ACK/NACK that includes SR or does not include SR |
| Format 1b | 2 bit HARQ ACK/NACK that includes SR or does not include SR |
| Format 2 | CQI(20 coded Bits) |
| Format 2 | CQI and 1 or 2 bit HARQ ACK/NACK for extended CP |
| Format 2a | CQI and 1 bit HARQ ACK/NACK |
| Format 2b | CQI and 2 bit HARQ ACK/NACK |

Referring to Table 1, the UCI based on the PUCCH format may be identified.

2. Multi-Carrier Aggregation Environment

A communication environment considered by the embodiments of the present invention includes a multi-carrier environment. In other words, a multi-carrier system or carrier aggregation system used in the present invention means a system that one or more carriers having a bandwidth smaller than a target bandwidth are aggregated when a target wideband is configured, to support a wideband.

In the present invention, multi-carrier means aggregation of carriers (or carrier aggregation). At this time, carrier aggregation means aggregation between non-neighboring carriers as well as aggregation between neighboring carriers. Also, carrier aggregation may be used to refer to bandwidth aggregation.

Multi-carrier (that is, carrier aggregation) configured by aggregation of two or more component carriers (CC) aims to support a bandwidth of 100 MHz in the LTE-A system. When one or more carriers having a bandwidth smaller than a target bandwidth are aggregated, a bandwidth of the aggregated carriers may be limited to a bandwidth used in the existing system to maintain backward compatibility with the existing IMT system.

For example, the 3GPP LTE system supports bandwidths of {1.4, 3, 5, 10, 15, 20} MHz, and the 3GPP LTE_advanced system (that is, LTE A) may support a bandwidth greater than 20 MHz using the above bandwidths supported by the LTE system. Also, the multi-carrier system used in the present invention may support carrier aggregation by defining a new bandwidth regardless of the bandwidth used in the existing system.

Figure 5:
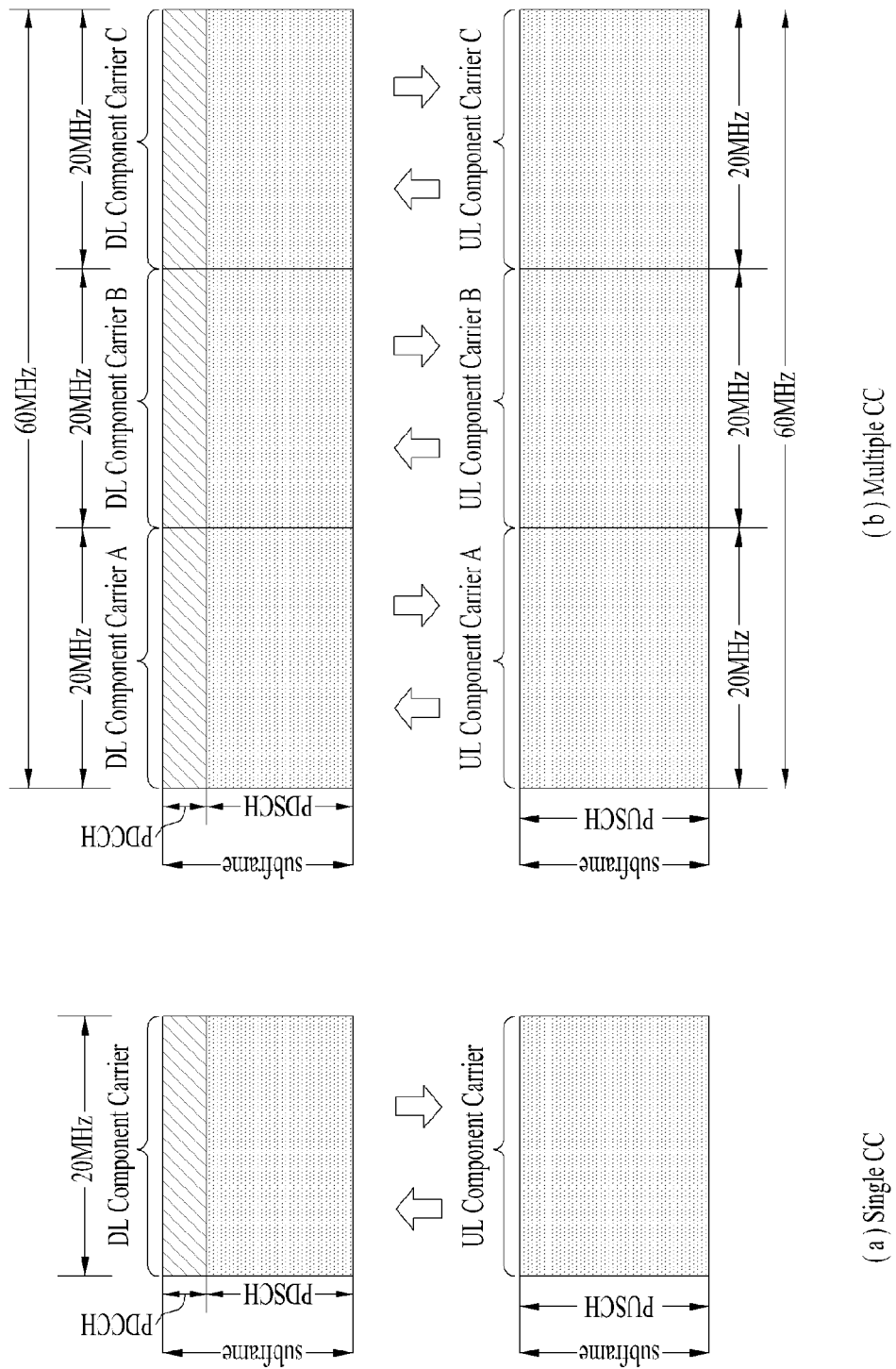
FIG. 5 is a diagram illustrating an example of component carriers (CC) of an LTE system and multi-carrier aggregation used in an LTE-A system.

FIG. 5 is a diagram illustrating an example of a component carrier (CC) of an LTE system and multicarrier aggregation (carrier aggregation) used in an LTE-A system.

FIG. 5(a) illustrates a single carrier structure used in the LTE system. The component carrier includes a downlink component carrier (DL CC) and an uplink component carrier (UL CC). One component carrier may have a frequency range of 20 MHz.

FIG. 5(b) illustrates a multi-carrier structure used in the LTE-A system. In FIG. 5(b), three component carriers having a frequency size of 20 MHz are aggregated. In case of multi-carrier aggregation, the user equipment may monitor three component carriers at the same time, receive downlink signal/data and transmit uplink signal/data.

If N DL CCs are managed by a specific cell, the network may allocate M (M≤N) number of DL CCs to the user equipment. At this time, the user equipment may monitor M number of limited DL CCs only and receive DL signal. Also, the network may give L (L≤M≤N) number of DL CCs a priority and allocate them to the user equipment as main DL CCs. In this case, the user equipment should L number of DL CCs necessarily. This system may also be applied to uplink transmission.

The LTE-A system uses a concept of cell to manage a radio resource. The cell is defined by combination of downlink resources and uplink resources, wherein the uplink resources may be defined selectively. Accordingly, the cell may be configured by downlink resources only, or may be configured by downlink resources and uplink resources. If multi-carrier (that is, carrier aggregation) is supported, linkage between carrier frequency (or DL CC) of the downlink resources and carrier frequency (or UL CC) of the uplink resources may be indicated by system information.

The cell used in the LTE-A system includes a primary cell (PCell) and a secondary cell (SCell). The P cell may mean a cell operated on the primary frequency (or primary CC), and the S cell may mean a cell operated on the secondary frequency (or secondary CC). However, a single P cell may be allocated to a specific user equipment and one or more S cells may be allocated to the specific user equipment.

The P cell is used such that the user equipment performs an initial connection establishment procedure or connection re-establishment procedure. The P cell may refer to a cell indicated during a handover procedure. The S cell may be configured after RRC connection is established, and may be used to provide an additional radio resource.

The P cell and the S cell may be used as serving cells. Although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include a P cell and one or more S cells.

After an initial security activity procedure starts, the E-UTRAN may configure a network that includes one or more S cells in addition to a P cell initially configured during a connection establishment procedure. In the multi-carrier environment, the P cell and the S cell may be operated as component carriers, respectively. In other words, carrier matching may be understood by aggregation of the P cell and one or more S cells. In the following embodiment, the primary component carrier (PCC) may be used to refer to the P cell, and the secondary component carrier (SCC) may be used to refer to the S cell.

3. Control Channel

Figure 6:
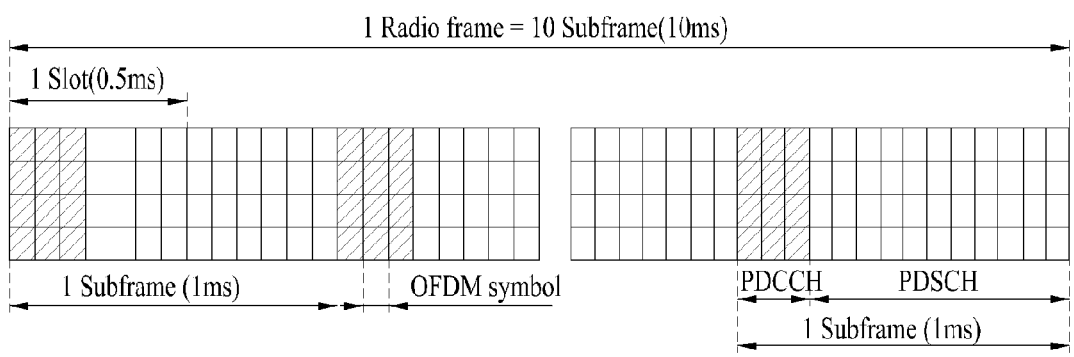
FIG. 6 is a diagram illustrating an example of a control channel region and a data channel region.

FIG. 6 is a diagram illustrating an example of a control channel region and a data channel region.

Referring to FIG. 6, one radio frame includes ten subframes, each of which includes two slots. Also, one slot may include seven OFDM symbols.

The control channel of the LTE system may be mapped into the control channel region only in a state that the control channel region (n number of OFDM symbols, n≤3) and the data channel region are identified from each other by time division mode (e.g. TDM). A reference signal, PCFICH and PHICH as well as the control channel (PDCCH) may be mapped into the control channel region. Also, the data channel may be mapped into the data channel region only, and PDSCH, etc. may be allocated to the data channel region.

Figure 7:
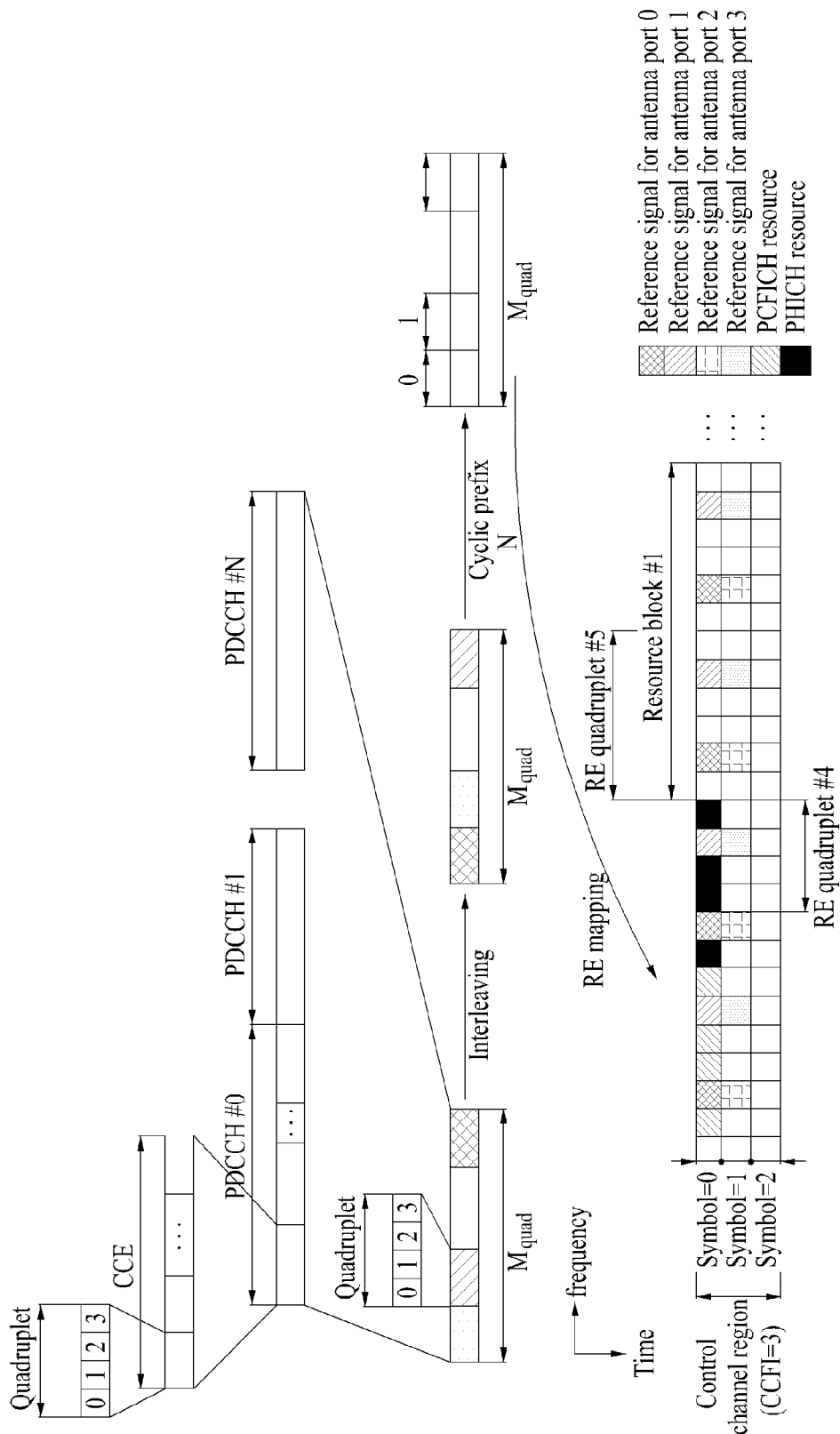
FIG. 7 is a diagram illustrating an example of a procedure of mapping a PDCCH into a control channel region.

FIG. 7 is a diagram illustrating an example of a procedure of mapping a PDCCH into a control channel region.

The base station (eNB; eNode-B) may transmit DCI through the PDCCH. The base station configures information bits based on the DCI format as modulation symbols through tail biting convolutional coding, rate matching and modulation.

Referring to FIG. 7, each modulation symbol may be mapped into resource elements (REs). One resource element group (REG) is configured by four REs. At this time, the REG may be referred to as quadruplet. Also, one control channel element (CCE) is configured by nine REGs. The base station may use CCEs of {1, 2, 4, 8} to configure one PDCCH signal. At this time, {1, 2, 4, 8} will be referred to as a CCE aggregation level (L).

The base station performs interleaving for the control channel configured by CCEs in a unit of REG, performs cyclic shift for the interleaved control channel based on cell ID, and then maps the control channel into physical resources. In the LTE system, since the user equipment may not know where its PDCCH is transmitted in accordance with what CCE aggregation level or DCI format to receive the control channel transmitted from the base station, it performs blind decoding (BD) for the search space (SS) to decode the PDCCH.

Blind decoding means that the user equipment performs demasking for its UE ID in a CRC portion and then determines whether the corresponding PDCCH is its control channel by detecting a CRC error. In the LTE system and the LTE-A system, the concept of the search space (SS) is defined for blind decoding of the user equipment.

Figure 8:
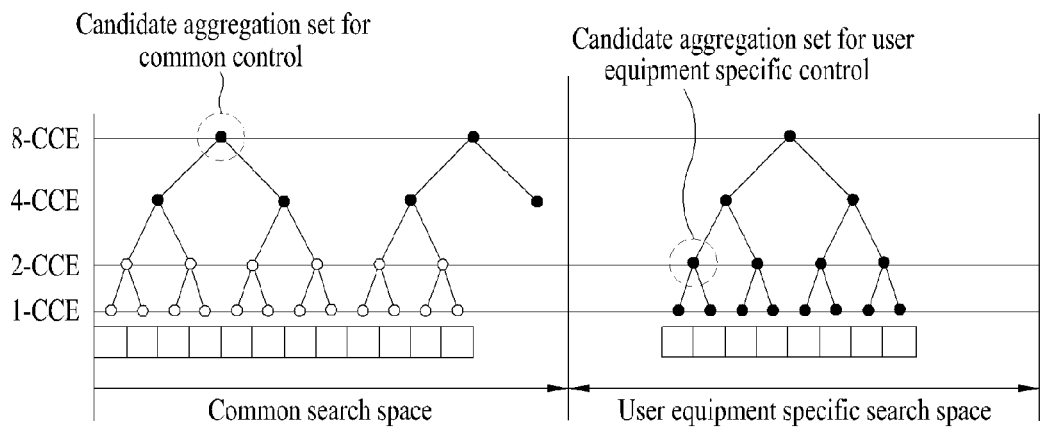
FIG. 8 is a diagram illustrating an example of a search space used in an LTE system.

FIG. 8 is a diagram illustrating an example of a search space used in an LTE system.

Referring to FIG. 8, the search space may include a common search space (CSS) and a user equipment specific (UE-specific) search space (USS). As shown in FIG. 8, the common search space (CSS) includes 16 CCEs of 0 to 15 CCE indexes, and supports the PDCCHs having a CCE aggregation level of {4, 8}. The user equipment specific search space (USS) includes CCEs of CCE indexes $0 \sim N_{CCE-1}$ and supports PDCCHs having an aggregation level of {1, 2, 4, 8}.

As described above, the CCE indexes of the common search space are 0~15 and the CCE index region that may configure the user equipment specific search space may occupy $0 \sim N_{CCE-1}$. This means that the common search space and the user equipment specific search space may be overlapped with each other. The user equipment may perform blind decoding to discover its PDCCH within the user equipment specific search space. To this end, the user equipment calculates a start point of the user equipment specific search space where the blind decoding will start, by using its UE ID and the CCE aggregation level (L). At this time, if the CCE indexes of the start point for the user equipment specific search space are 0~15, the user equipment specific search space overlapped with the common search space is configured.

In the LTE system, the CSS and the USS may be configured as illustrated in Table 2 below.

TABLE 2

| Type | Search Space $S_k^{(L)}$ | | The number $M^{(L)}$ of candidate PDCCHs | DCI format |
|---|---|---|---|---|
| | Aggregation Level L | Size (CCEs) | | |
| User equipment specific search space (USS) | 1 | 6 | 6 | 0, 1, 1A, 1B, 2 |
| | 2 | 12 | 6 | |
| | 4 | 8 | 2 | |
| | 8 | 16 | 2 | |
| Common search space (CSS) | 4 | 16 | 4 | 0, 1A, 1C, 3/3A |
| | 8 | 16 | 2 | |

Hereinafter, the PDCCH for DL/UL scheduling allocation information of DL allocation and UL grant, that is, the relation of the search space where DCI formats may be transmitted and types of DCI formats will be described.

If the user equipment is configured to decode CRC scrambled PDCCH by using C-RNTI, it may decode the PDCCH in accordance with aggregation defined in Table 3 below. Also, the user equipment may transmit the PUSCH corresponding to the PDCCH.

TABLE 3

| DCI Format | Search space |
|---|---|
| DCI Format 0 | CSS and USS |

Referring to Table 3, the user equipment may perform scrambling initiation for the PUSCH corresponding to the PDCCH and PUSCH retransmission for the same transport blocks by using C-RNTI.

If the user equipment is configured from the higher layer to decode the CRC scrambled PDCCH by using C-RNTI and receive the PDCCH to receive downlink data, it may decode the PDCCH based on Table 4 below.

TABLE 4

| DCI Format | Search space |
|---|---|
| DCI Format 1A | CSS and USS |

If the user equipment is configured from the higher layer to decode the CRC scrambled PDCCH by using C-RNTI, it is preferable that the user equipment decodes the PDCCH and the PDSCH corresponding to the PDCCH in accordance with aggregation defined in Table 5 below.

TABLE 5

| UE DL Transmission mode | DCI format | Search space | Transmission scheme of PDSCH corresponding to PDCCH |
|---|---|---|---|
| Mode 1 | DCI format 1A | CSS and USS | Single antenna port, port 0 |
| | DCI format 1 | USS | Single antenna port, port 0 |
| Mode 2 | DCI format 1A | CSS and USS | Transmission diversity |
| | DCI format 1 | USS | Transmission diversity |
| Mode 3 | DCI format 1A | CSS and USS | Transmission diversity |
| | DCI format 2A | USS | Open-loop spatial multiplexing (SM) or Transmission diversity |
| Mode 4 | DCI format 1A | CSS and USS | Transmission diversity |
| | DCI format 2 | USS | Closed-loop spatial multiplexing (SM) or Transmission diversity |
| Mode 5 | DCI format 1A | CSS and USS | Transmission diversity |
| | DCI format 1D | USS | Multi-user MIMO |
| Mode 6 | DCI format 1A | CSS and USS | Transmission diversity |
| | DCI format 1B | USS | Closed-loop rank = 1 precoding |
| Mode 7 | DCI format 1 | ACSS and USS | If the number of PBCH antennas is 1, port 0 is used, and if not so, transmission diversity is used. |
| | DCI format 1 | USS | Single antenna port, port 5 |

Referring to Table 5, initiation of scrambling of the PDSCH corresponding to the PDCCH may be performed by C-RNTI. If the user equipment is configured by transmission mode 3 or 4 and receives DCI formation 1A, PDSCH transmission may be associated with transport block 1, and transport block 2 may be disregarded. If the user equipment is configured by transmission mode 7, initiation of scrambling of USS reference signals corresponding to the PDCCH is performed by C-RNTI.

In Table 5, the transmission mode may include seven transmission modes as follows:

(1) single antenna port (that is, port 0), (2) transmit diversity, (3) open-loop spatial multiplexing, (4) closed-loop spatial multiplexing, (5) multi-user MIMO, (6) closed-loop rank=1 precoding, and (7) single antenna port (that is, port 5).

The user equipment may be configured semi-statically from the higher layer to receive PDSCH data signaled through the PDCCH. At this time, the user equipment may decode the user equipment specific search space (USS) by using one of the seven transmission modes.

Also, the DCI formats are identified from one another for the purpose of the following objects.

For example, the DCI format 0 is used for PUSCH scheduling, the DCI format 1 is used for scheduling of PDSCH codewords, the DCI format 1A is used for compact scheduling one of a random access procedure initiated by the PDCCH order and PDSCH codewords, the DCI format 1B is used for compact scheduling of PDSCH codewords together with precoding information, the DCI format 1C is used for compact scheduling of PDSCH codewords, the DCI format 1D is used for compact scheduling of PDSCH codewords together with precoding and power offset information, the DCI format 2 is used for PDSCH scheduling for user equipments set in the closed-loop multiplexing mode, the DCI format 2A is used for PDSCH scheduling for the user equipment set in the open-loop spatial multiplexing mode, and the DCI format 3 is used for transmission of TPC commands for the PUSCH and the PUCCH together with 2-bit power coordination and used for transmission of TPC commands for the PUCCH and the PUSCH together with single bit power coordination.

The aforementioned PDCCH transmission procedure and the blind decoding based on the search space may be used in the FDD mode of the LTE system. At this time, the user equipment transmits and receives the control channel and the data channel by using one downlink (DL) carrier and uplink (UL) carrier, the aforementioned operations may be performed by a single carrier.

However, in the LTE-A system, the method such as carrier aggregation (CA) may be used to support a system bandwidth broader than that of the existing LTE system. In this case, it is required that the carrier aggregation technology should be applied to the transmission method of the existing system. In particular, if the legacy LTE user equipment that transmits and receives a single carrier only in the system based on carrier aggregation (CA), the LTE-A user equipment (particularly, LTE-A user equipment that supports a single component carrier only in accordance with definition of UE capability) and the LTE-A user equipment that uses carrier aggregation coexist, a method for transmitting and receiving a proper control channel for the LTE-A user equipment will be required.

4. Cross Carrier Scheduling

As methods for transmitting a control channel in an LTE-A system that uses carrier aggregation (CA), a separate coding method and a joint coding method may be considered, wherein the separate coding method is that the user equipment transmits PDCCHs per component carrier by separately encoding them, and the joint coding method is that the user equipment transmits two or more CCs by encoding them. The embodiments of the present invention suggest a method for configuring a search space for separate coding. The PDCCHs separately coded per CC may be transmitted on multiple carriers as described in the following methods 1a and 1b.

1a) One PDCCH may indicate only allocation on the same component carrier.

1b) One PDCCH may indicate allocation on the same component carrier or different component carriers.

In case of the method 1a), the PDCCH may indicate the PDSCH allocated on the same CC as the CC (or serving cell) to which the PDCCH is transmitted. In case of the method 1b), the PDCCH may indicate the PDSCH allocated to a random CC regardless of the CC (or serving cell) to which the PDCCH is transmitted.

In view of PUSCH transmission, in the method 1a), there is fixed linkage between the DL CC to which the PDCCH is transmitted and the UL CC to which the PUSCH is transmitted, and the PDCCH for the PUSCH which will be transmitted to a specific UL CC is transmitted to the DL CC only connected to the PDCCH. Also, in case of the method 1b), the base station may transmit UL grant to a random DL CC regardless of linkage between the DL CC and the UL CC to which the PUSCH will be transmitted. The transmission method based on the method 1a may be referred to as a self-scheduling method, and the transmission method based on the method 1b may be referred to as a cross carrier scheduling method.

Cross carrier scheduling is not supported by the PDCCH structure and the DCI format defined in the LTE Rel-8 standard (that is, LTE system). In other words, the self-scheduling method uses the DCI format and the PDCCH transmission structure (resource mapping based on the same coding method and same CCE) of the existing LTE system. For example, the PDCCH on the component carrier serves to allocate PDSCH resources to the same component carrier and allocate PUSCH resources to associated UL component carriers. In this case, a carrier indicator field (CIF) is not required. Also, related PDSCH transmission, UL A/N, PUSCH transmission and PHICH transmission follow the LTE Rel-8 specifications.

Cross carrier scheduling may be supported by the PDCCH structure and the DCI format defined in the LTE-A system (that is, LTE Rel-10 specifications). In other words, the PDCCH (DL grant) and the PDSCH may be transmitted to their respective DL CCs different from each other, or the PUSCH transmitted depending on the PDCCH (UL grant) transmitted from the DL CC may be transmitted through another UL CC not the UL CC associated with the DL CC that has received the UL grant. In this case, a carrier indicator field (CIF) notifying the PDCCH of DL/UL CC through which the PDSCH/PUSCH indicated by the corresponding PDCCH is transmitted. For example, the PDCCH may allocate PDSCH resource or PUSCH resource to one of a plurality of component carriers by using the carrier indicator field. To this end, the DCI format of the LTE-A system may be extended in accordance with the CIF of 1 to 3 bits (preferably, fixed 3 bits), and the PDCCH structure of the LTE Rel-8 system may be reused. Also, modifications different from the existing system may be required for PDSCH transmission, UL A/N, PUSCH transmission and PHICH transmission depending on cross carrier scheduling.

Whether to grant cross carrier scheduling may be determined user equipment specifically (UE-specifically), user equipment group specifically (UE group-specifically) or cell-specifically. The operation of the cross carrier scheduling may be toggled semi-statically to reduce signaling overhead. Accordingly, grant of the cross carrier scheduling, that is, size of the CIF based on activation/de-activation may be configured semi-statically. This is similar to that the user equipment specific transmission mode is determined semi-statically in the LTE Rel-8 system.

If the cross carrier scheduling is deactivated, it means that the PDCCH monitoring set is always the same as the UE DL CC set. In this case, separate signaling for the PDCCH monitoring set will not be required. If the cross carrier scheduling is activated, it is preferable that the PDCCH monitoring set is defined in the UE DL CC set. In this case, separate signaling for the PDCCH monitoring set will be required.

If the aforementioned PDCCH transmission method 1a is used, since the PDCCH is always transmitted through the CC through which the PDSCH is transmitted, the existing single carrier based search space may be used.

However, if the aforementioned PDCCH transmission method 1b is used, since the PDCCH may be transmitted through a random CC regardless of the CC through which the PDSCH is transmitted, one user equipment is required to receive a plurality of PDCCHs for the same DCI format within one CC. Also, if transmission modes for one or more DL CCs through which the PDSCH is transmitted are different from one another (including a new transmission mode defined in the LTE-A system in addition to the aforementioned seven transmission modes), one user equipment may be required to receive a plurality of PDCCHs for different DCI formats through the DL CC through which the PDCCH is transmitted.

Also, if the same transmission mode is used by one or more DL CCs through which the PDSCH is transmitted, each user equipment should perform blind decoding for a plurality of PDCCHs with respect to payload size of different DCI formats even in case of the same DCI format if bandwidths of the respective DL CCs are different from one another. In other words, it is preferable that cross carrier scheduling is used, and each user equipment receives one or more PDCCHs for one or more DCI formats for each DL CC subframe in accordance with transmission mode and bandwidth per carrier. Accordingly, in order to support this, it is required that the method for configuring a search space and the operation of the user equipment for receiving the PDCCH should be defined.

In the system that supports carrier aggregation, a user equipment DL CC set (UE DL CC set), a user equipment UL CC set, and a PDCCH monitoring set may be defined as follows to effectively support transmission and reception of control information and data information of the user equipment and cross carrier scheduling.

The user equipment DL CC set is a DL component carrier set scheduled to allow the user equipment to receive a PDSCH signal, and may be dedicated for each user equipment through higher layer signaling.

The user equipment UL CC set is a UL component carrier set scheduled to transmit a PUSCH signal.

The PDCCH monitoring set is a separate set different from the user equipment DL CC set and the user equipment UL CC set, and may be configured within the user equipment DL CC set or to include a part of the user equipment DL CC set (i.e., PDCCH monitoring set □ UE DL CC set). Alternatively, one or more CCs of CCs different from the user equipment DL CC set may be configured as the PDCCH monitoring set. The PDCCH monitoring set may be configured user equipment specifically or cell specifically.

At this time, the user equipment is not required to perform blind decoding for DL CC which is not configured to receive the PDCCH. In this case, the probability of failure in PDCCH detection may be reduced. Accordingly, the PDCCH monitoring set has the following features.

Set of DL CCs required to allow the user equipment to monitor the PDCCH.

The PDCCH monitoring set has a size smaller than or equal to that of the user equipment DL CC set, and may be configured by CCs only included in the user equipment DL CC set.

Figure 9:
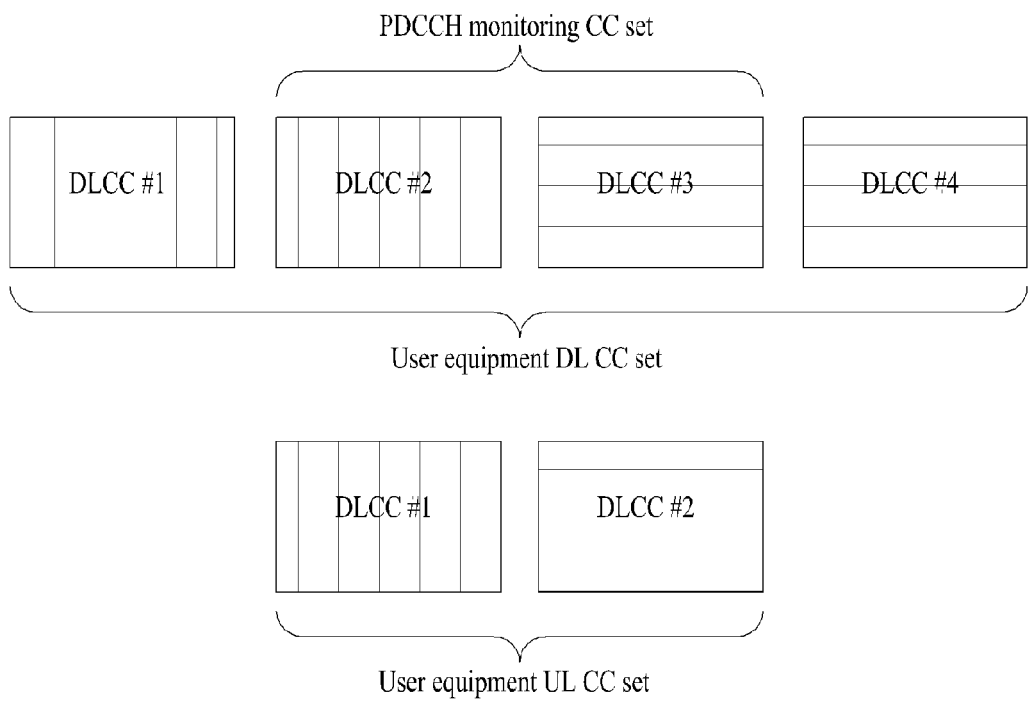
FIG. 9 is a diagram illustrating an example of a linkage between component carriers of a PDCCH monitoring set and a user equipment DL/UL CC set.

FIG. 9 is a diagram illustrating an example of linkage between component carriers of a PDCCH monitoring set and a user equipment DL/UL CC set.

If UE DL/UL CC set per user equipment and PDCCH monitoring set exist, a linkage for PDCCH transmission and PDSCH/PUSCH transmission may be configured between the CCs included in the PDCCH monitoring set and the UE DL/UL CC set. For example, it is assumed that four DL CCs (DL CC #1, #2, #3, #4) as the UE DL CC set, two UL CCs (UL CC #1, #2) as the UE UL CC set, and two DL CCs (DL CC #2, #3) as the PDCCH monitoring set are allocated to a random user equipment.

At this time, PDCCH signal for PUSCH signal and PDSCH signal, which will be transmitted to DL CC #1 and #2 of the UE DL CC set and UL CC #1 of the UE UL CC set, may be transmitted through DL CC #2 within the PDCCH monitoring set, and PDCCH signal for PUSCH signal and PDSCH signal, which will be transmitted to DL CC #3 and #4 of the UE DL CC set and UL CC #2 of the UE UL CC set, may be transmitted through DL CC #3 within the PDCCH monitoring set.

Referring to FIG. 9, vertically slashed CCs may have a linkage of signal transmission in PDCCH signal, PDSCH signal and PUSCH signal while horizontally slashed CCs may have a linkage of signal transmission in PDCCH signal, PDSCH signal and PUSCH signal. In this case, linkage information between component carriers through which the PDCCH signal is transmitted and component carriers through which the PUSCH/PUSCH signal is transmitted may be determined in accordance with cell specific linkage or may be transmitted through user equipment specific signaling.

Also, both a linkage between CC through which the PDCCH signal is transmitted and CC through which the PDSCH signal is transmitted and a linkage between CC through which the PDCCH signal is transmitted and CC through which the PUSCH signal is transmitted may not be configured but the linkage between CC through which the PDCCH signal is transmitted and CC through which the PDSCH signal is transmitted may only be configured. Then, PUSCH signal transmission may be limited within UL CC set associated with CCs through which the PDSCH signal included in the linked set will be transmitted.

If linkage information between CC through which the PDCCH signal is transmitted and CCs through which the PDSCH/PUSCH signals are transmitted is transmitted, the user equipment should perform blind decoding within all the DL CCs configured by the PDCCH monitoring set to receive scheduling allocation information on the shared channels that may be transmitted to the user equipment DL/UL CC set. This requires excessive blind decoding operation and is not preferable in view of power consumption and processing delay of the user equipment. Accordingly, in the embodiments of the present invention, it is required to configure a search space that does not increase the number of blind decoding times of the user equipment as compared with the LTE system.

Referring to Table 2, it is defined such that the user equipment specific search space (USS) of the LTE system has six candidate PDCCHs for each of CCE aggregation levels 1 and 2 and two candidate PDCCHs for each of CCE aggregation levels 4 and 8. Also, it is defined such that the user equipment performs blind decoding in the common search space (CSS) by using four candidate PDCCHs and two candidate PDCCHs for CCE aggregation levels 4 and 8, respectively.

In other words, in the LTE system, component carriers (CCs), through which the PDCCH signal and the PDSCH signal are transmitted based on DL/UL single carrier, are the same as each other, and CCs through which the PDCCH signal and the PUSCH signal are transmitted are fixed in accordance with DL-UL linkage.

If the PDCCH is transmitted using cross carrier scheduling, since a plurality of PDCCHs for one user equipment may be transmitted to one DL CC, all the PDCCHs may not be scheduled by the candidate PDCCH defined in the LTE system. Also, in scheduling the plurality of PDCCHs, flexibility may be deteriorated, and PDCCH blocking probability may be increased. This is because that PDCCHs more than those of the existing LTE Rel-8 system should be transmitted within the search space configured by limited candidate PDCCHs.

Moreover, in the case that a carrier having no PDCCH exists for interference coordination in a multi-cell environment such as heterogeneous networks, or in the case that a carrier through control channels may be transmitted is limited on carrier configuration of a random cell, a plurality of PDCCHs may be concentrated on a specific DL CC. For this reason, resources included in a control region may cause the quantity of the limited search space to be insufficient in view of absolute resources.

Accordingly, when a PDCCH signal is transmitted using carrier aggregation (CA) and cross carrier scheduling, methods for solving the status where the search space for allowing the user equipment to perform blinding decoding is not sufficient will be disclosed hereinafter.

5. Extension of Candidate PDCCHs

In a wireless access system that supports cross carrier scheduling, a plurality of PDCCHs for a specific user equipment may be transmitted through one DL CC. In the embodiments of the present invention, methods for increasing the number of candidate PDCCHs for a user equipment specific search space (UCC) to efficiently transmit PDCCHs for a specific user equipment will be described. In other words, methods for increasing the number of candidate PDCCHs per CCE aggregation level L to obtain UCC will be described.

The extended search space defined by a random number of candidate PDCCHs may be defined per carrier (or serving cell) in the embodiments of the present invention.

A scheduler included in a processor of the base station may transmit DL channel allocation PDCCH or UL grant PDCCH for the corresponding carrier through the search space defined per separate carrier configured for the corresponding user equipment. Also, the user equipment may perform blind decoding in the extended search space defined per carrier to search for DL channel allocation PDCCH or UL grant PDCCH for a random carrier.

In the embodiments of the present invention, search space (SS) starting point of the first carrier or a series of reference carriers (for example, PCC, anchor CC or self-scheduling CC) on indexes of configuration carriers may be designated as a result of a hashing function for a random user equipment. However, SS starting points for the other carriers may be defined consecutively, or search space starting point of the second carrier may be defined with an offset value (offset value is an integer) fixed from the starting point of the reference carrier designated as the hashing function. In this way, search space starting points for the other CCs may be defined.

Accordingly, among PDSCH/PUSCH CCs which are scheduling targets in one PDCCH monitoring CC set, the search space for CC having the lowest CC index or the search space for a reference CC, that is, a primary CC (PCC), an anchor CC or self-scheduling CC, may be obtained on the basis of the hashing function for calculating SS starting point of the LTE Rel-8 system. Also, the search space for the other PDSCH/PUSCH CCs that may be scheduled in the same PDCCH monitoring CC set, may be configured consecutively subsequent to the SS configured based on the hashing function, or may be configured using a specific offset value.

Figure 10:
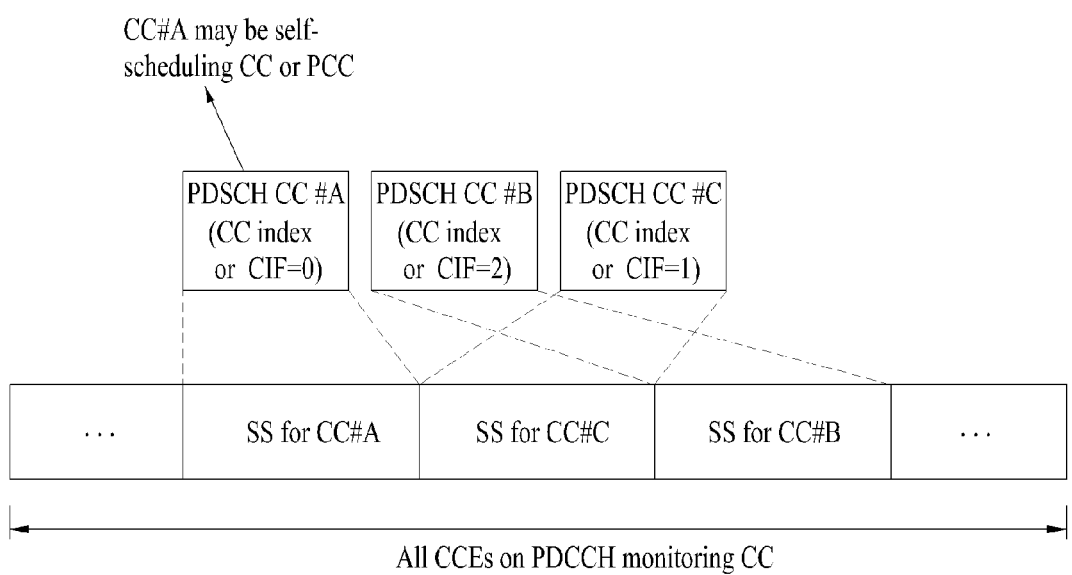
FIG. 10 is a diagram illustrating one of methods for configuring a search space of component carriers scheduled as the embodiment of the present invention.

FIG. 10 is a diagram illustrating one of methods for configuring a search space of component carriers scheduled as the embodiment of the present invention.

In case of cross carrier scheduling, the base station transmits grant information on one or more PDSCH CCs and PUSCH CCs from one PDCCH monitoring CC set to the user equipment. At this time, if the search space (SS) is configured on the basis of a hashing function, the CC scheduled by the SS may be scheduled on the basis of one of (1) CC having the lowest CC index among a plurality of scheduled CCs, (2) self-scheduled CC, and (3) primary CC (PCC).

Referring to FIG. 10, PDSCH CC#A has CC index value or CIF value of 0, PDSCH CC#B has CC index value or CIF value of 2, and PDSCH CC#C has CC index value or CIF value of 1. Accordingly, the search space (SS) may be configured consecutively in the order of CC indexes or CIF, that is, CC #A, CC #C and CC #B.

When a search space (SS) for a specific CC is configured using a hashing function as described above, a method for configuring a searching space (SS) for other scheduled CCs will be described. In particular, if search spaces (SS) for cross carrier scheduled PDCCHs are configured consecutively, the search spaces for the other scheduled CCs except for the reference search space configured based on the hashing function may be configured from the reference search space.

If the search space (SS) for CC having the lowest CC index among a plurality of scheduled CCs is configured using the hashing function, after the search space for CC having the lowest CC index among the other scheduled CCs is configured subsequently to the reference search space, the search spaces for CCs having CC index of ascending order may be configured consecutively.

If the search space for self-scheduling CC or primary CC (PCC) is configured using the hashing function, after the search space for CC having the lowest CC index among the other scheduled CCs except for the self-scheduling CC and the PCC is configured subsequently to the reference search space, the search spaces for CCs having CC index of ascending order may be configured consecutively.

At this time, the CC index which is used may be a logical CC index of the scheduled CCs or CIF which will be included in the PDCCH for each of the scheduled CCs. If the search spaces for multi-scheduled CCs by CIF value are configured, since mapped CIF value may be varied physically for a specific CC #A depending on CIF configuration/reconfiguration, the locations of the search spaces of a plurality of scheduled CCs allocated to the same user equipment may be varied. In this case, blocking occurring if the search spaces between the specific CCs or the specific user equipments are continuously overlapped with each other may be reduced.

Figure 11:
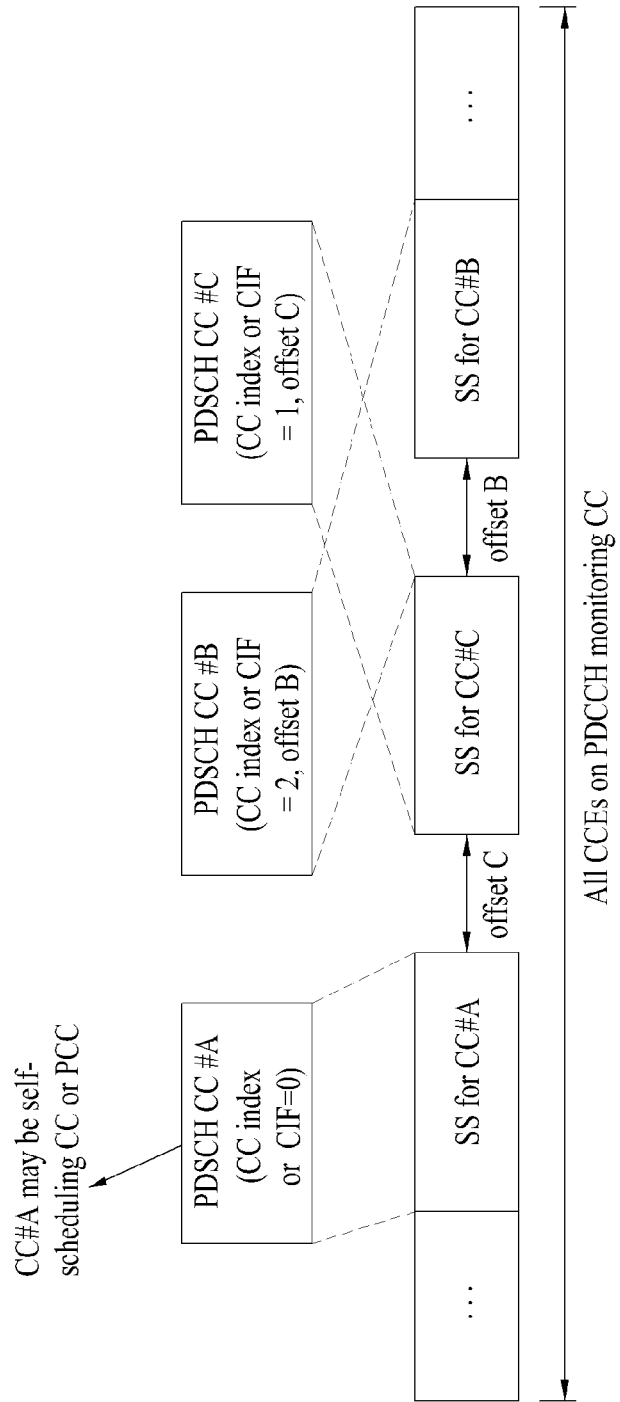
FIG. 11 is a diagram illustrating the other one of methods for configuring a search space of component carriers scheduled as the embodiment of the present invention.

FIG. 11 is a diagram illustrating the other one of methods for configuring a search space of component carriers scheduled as the embodiment of the present invention.

On the basis of offset from a reference scheduled CC in the search space (SS), the search space (SS) for the other scheduled CCs may be configured. At this time, offset may be offset from a starting point of the search space configured on the basis of a hashing function, or may be offset from the last point of the search space.

Referring to FIG. 11, PDSCH CC#A may be configured as a reference carrier, and PDSCH CC#C may be allocated as an offset value C on the basis of CC#A. Also, CC#B may be allocated from CC#C as an offset value B.

For example, in a state that two PDSCH CCs may be scheduled by a specific PDCCH monitoring CC, a search space (SS) starting point of PDSCH CC #1 may be configured on the basis of a hashing function. At this time, if the search space starting point is CC index 20, the search space for the CCE aggregation level 1 may be set to CCE indexes 20 to 25. Also, if offset of a search space for the other PDSCH CC #2 is designated as 3, the search space (SS) for PDSCH CC #2 may be set to CCE indexes 28 to 33 as offset 3 is applied after CCE index 25 which is the last point of the search space (SS) of the reference PDSCH CC. Otherwise, the search space (SS) for PDSCH CC #2 may be set to CCE index 23 to 28 as offset 3 is applied from the CCE index 20 which is the starting point.

Accordingly, the USS may be defined to overlap the CSS. In FIG. 11, the offset value may be set to (+) offset or (−) offset to control overlap between the search spaces. In the LTE-A system, the offset value may be determined as (+) or (−) depending on carrier aggregation performance and blind decoding performance of the user equipment, or the determined offset value may be signaled.

Also, if the offset value is used in configuring the search space, the respective search spaces configured per CC may be set to overlap each other if DCI transmitted to each CC has the same size (for example, use of (−) offset). The respective search spaces configured per CC may be set so as not to overlap each other if DCI transmitted to each CC has different sizes (for example, use of (+) offset).

At this time, the same offset value may be used per carrier, or different offset values may be used per carrier. If the offset value is set to the same CCE level value as that of the search space of the reference carrier, the search space may be defined to consecutively aggregate the respective carriers.

The method for configuring a search space in a carrier aggregation environment by using offset will be described in more detail.

The search space starting point for PDCCH transmission of the reference CC may be designated as a result of a hashing function for a random user equipment. At this time, the PDCCH of the reference CC may be the PDCCH of CC such as primary CC (PCC) or anchor CC. Alternatively, the PDCCH of the reference CC may be the PDCCH transmitted for self-scheduling from the PDCCH monitoring CC. For example, the PDCCH of the reference CC may not be the cross carrier scheduled PDCCH but be a PDCCH signal used for scheduling of PDSCH signal or PUSCH signal transmitted through a corresponding PDCCH monitoring DL CC or UL CC connected with the corresponding PDCCH monitoring DL CC. The self-scheduling PDCCH may configure the search space by generating the search space starting point, and the other cross carrier scheduling PDCCHs may be configured in the search space of the self-scheduling PDCCH on the basis of offset.

The search space of the LTE-A system may be used as the search space from the starting point of the reference PDCCH. For example, the starting point of the reference PDCCH may be set to $Y_K = (A \cdot Y_{k-1}) \mod D$. At this time, $Y_{k-1} = n_{RNTI} \neq 0$, $A = 39827$, $D = 65537$, and $k = \lfloor n_s/2 \rfloor$ may be set, wherein $n_s$ is a slot number of a radio frame.

The search space ($S_{k,c}^{(L)}$) from the starting point may be set as expressed by the following Equation 1.

$$S_{k,c}^{(L)} = L \cdot \{(Y_{k,c} + m) \mod \lfloor N_{CCE,k}/L \rfloor\} + i \quad \text{[Equation 1]}$$

In the Equation 1, $Y_{k,c} = n_{RNTI} \neq 0$, $i = 0, \ldots, L-1$, and $m = 0, \ldots, M^{(L)-1}$. Also, $M^{(L)}$ represents the number of PDCCH candidates which will be monitored by the corresponding search space. $N_{CCE,k}$ represents the number of CCEs included in the corresponding search space.

As described above, if multiple search spaces are generated using offset, multiple hashing functions may not be used by the user equipment, whereby PDCCH allocation procedure of the LTE Rel-8 system may be used. Also, the base station may configure the search space by properly controlling the offset value in such a manner that search spaces for multiple carriers may be spaced apart from one another or configured to partially overlap one another, or the same search space for multiple carriers may be configured.

In the embodiments of the present invention, examples of the offset value may include (1) carrier index, (2) carrier indictor field (CIF), and (3) function of carrier index (f(CI)).

If carrier index is used as the offset value in the embodiments of the present invention, different offsets between the scheduled CCs may be used.

If CIF value of each of the scheduled CCs is used as the offset value in the embodiments of the present invention, different offset values between the scheduled CCs may be used. If CIF is used for both self-scheduling CC and cross carrier scheduling CC, offset based on the CIF may be used for both the self-scheduling CC and the cross carrier scheduling CC. If the CIF is not used for the self-scheduling CC, CIF offset may be used for the cross carrier scheduling CC only. In the embodiments of the present invention, CIF value of 3 bits may be used for offset.

Also, in the embodiments of the present invention, the function of CI (f(CI)) may be used as the offset value. In other words, CI value and a random value based on the CI value may be used as the offset values. At this time, $f(CI) = X \cdot CI$ may be defined, wherein X may be a specific constant, or may be the number ($M^{(L)}$) of PDCCH candidates of each CCE aggregation level or a multiple of $M^{(L)}$.

Also, $f(CI) = XX + CI$ may be defined, wherein XX may be a specific constant, or may be the search space size of each CCE aggregation level considering the number of PDCCH candidates provided by each CCE aggregation level. For example, XX value may be set to 6 in case of aggregation level 1 (L1), 12 in case of aggregation level L2, 8 in case of aggregation level L4, and 16 in case of aggregation level L8. Otherwise, XX value may be set to the greatest value of the search space size that may be provided for each CCE aggregation level. Otherwise, XX value may be the number ($M^{(L)}$) of PDCCH candidates of each CCE aggregation level or a multiple of $M^{(L)}$.

The following Equation 2 represents one of methods for configuring a search space based on an offset value according to the embodiment of the present invention.

$$L \cdot \{(Y_k + m + M^{(L)} \cdot n_{CI\_CC\#p} + O_{CC\#p}) \mod \lfloor N_{CCE,k}/L \rfloor\} + i \quad \text{[Equation 2]}$$

In the Equation 2, $M^{(L)}$ represents the number of PDCCH candidates which will be monitored by the corresponding search space, $n_{CI_{CC\#p}}$ is a carrier index, and $O_{CC\#p}$ means the pth CC or CC #p. Also, $Y_K = (A \cdot Y_{k-1}) \mod D$, $Y_{k-1} = n_{RNTI} \neq 0$, and $k = \lfloor n_s/2 \rfloor$ may be set. Also, L means a CCE aggregation level, $N_{CCE,k}$ represents the number of CCEs included in the corresponding search space, and $i = 0, 1, \ldots, L-1$ may be set.

At this time, the carrier index for the self-scheduling CC is always set to 0, whereby the Equation 1 may be configured equally to the equation for determining a search space in the LTE Rel-8 system. If the search space is configured using the offset value and actual CC indexes are configured in the non-logical order of 0, 1, 2, the self-scheduling CC may be varied for configuration of consecutive search spaces in such a manner that the first CC index is set to 0, the second CC index is set to 1, and the third CC index is set to 2.

In the Equation 2, the reference scheduling CC or CC having the lowest PCC, CI or CIF may use the equation of $Y_k$, $S_k^{(L)}$ in the LTE Rel-8 system. In the Equation 2, all of the aforementioned offset values may be applied to $O_{cc\#p}$. For example, all of the aforementioned offset values such as carrier index, CI value known as CIF, difference in CI values of the reference CC, may be used as $O_{cc\#p}$.

The following Equation 3 represents the other one of methods for configuring a search space based on an offset value according to the embodiment of the present invention.

$$S_{k,CC=p}^{L} = L \cdot \{(Y_k + m + M^{(L)} \cdot n_{CI\_CC=p}) \mod \lfloor N_{CCE,k}/L \rfloor\} + i \quad \text{[Equation 3]}$$

In the Equation 3, $n_{CI\_CC\#p}$ is a kind of carrier index. The carrier index for the self-scheduling CC is always set to 0, whereby the Equation 3 may be configured equally to the equation for determining a search space in the LTE Rel-8 system. If actual CC indexes are configured in the non-logical order of 0, 1, 2, the self-scheduling CC may be varied for configuration of consecutive search spaces in such a manner that the first CC index is set to 0, the second CC index is set to 1, and the third CC index is set to 2.

The following Equation 3 may be varied as follows. For example, a number of active CC may be C ($c = 0, 1, \ldots, C-1$), and the Cth CC may be defined by a single hashing function and a CC specific offset. The following Equation 4 represents a modification example of the Equation 3.

$$S_{k,c}^{(L)}\{(Y_k+m+\text{Offset}) \bmod \lfloor N_{CCE,k}/L \rfloor\}+i \qquad \text{[Equation 4]}$$

In the Equation 3, the CC specific offset may be defined by the number of CCEs between the starting point given by the hashing function and the actual starting point of each CC. For example, the CC specific offset may be determined by (carrier index)*(distance).

In the Equation 3, examples of the carrier index value may be (1) CIF value, (2) CIF difference value between the (c−1)th CC and the Cth CC, (3) carrier index calculated on the basis of configured CCs, and/or (4) carrier index based on active CC.

Also, a "distance" value for obtaining the CC specific offset may be determined by (1) the number $M^{(L)}$ of PDCCH candidates per aggregation level (L), (2) a value greater than $M^{(L)}$ or (3) a value greater than $M^{(L)}$ if $$\left\lfloor \frac{N_{CCE,k}}{L \cdot C} \right\rfloor \cdot \left\lfloor \frac{\lfloor N_{CCE,k}/L \rfloor}{C} \right\rfloor$$

is defined.

Figure 12:
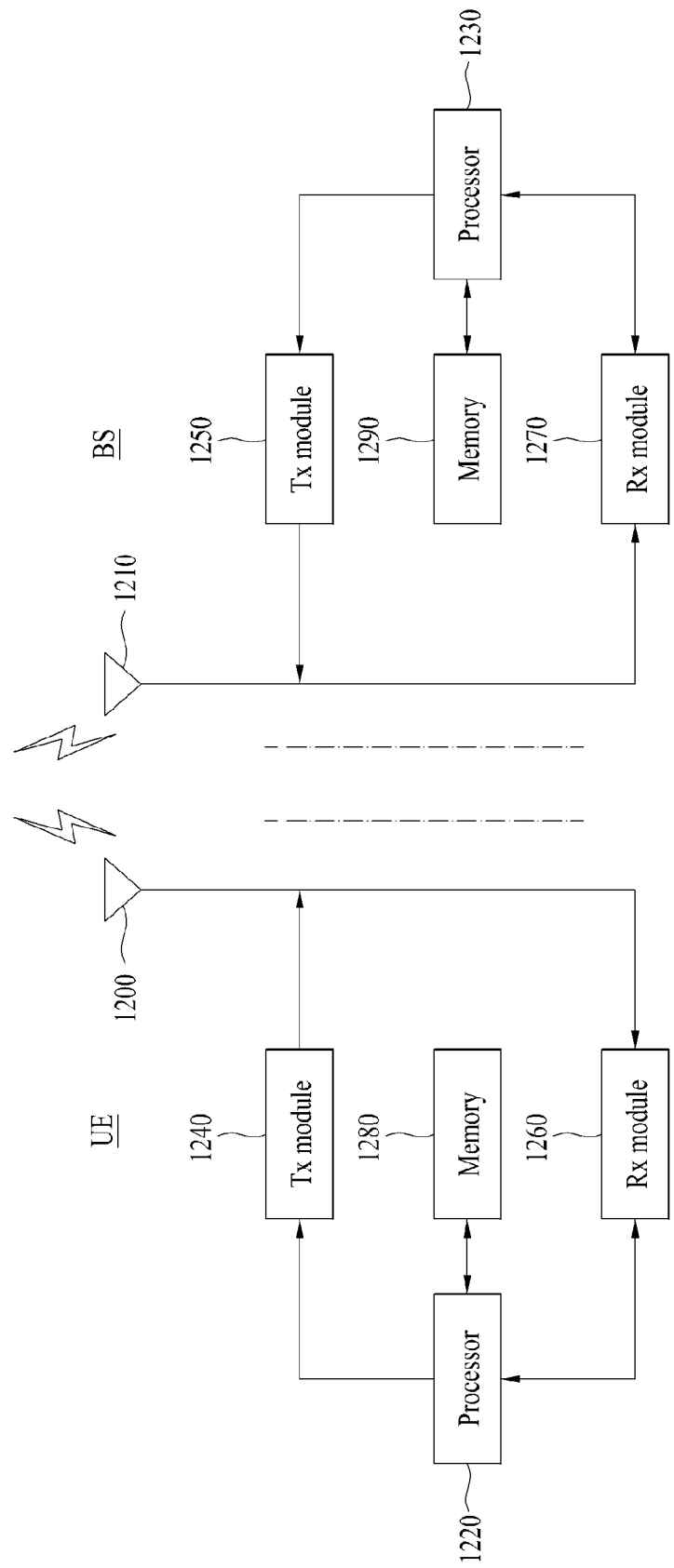
FIG. 12 is a diagram illustrating a base station and a user equipment, through which the embodiments of the present invention described in FIG. 1 to FIG. 11 may be carried out.

FIG. 12 is a diagram illustrating a base station and a user equipment, through which the embodiments of the present invention described in FIG. 1 to FIG. 11 may be carried out.

The user equipment may be operated as a transmitter on an uplink and as a receiver on a downlink. Also, the base station may be operated as a receiver on the uplink and as a transmitter on the downlink.

In other words, each of the user equipment and the base station may include a transmission (Tx) module 1240, 1250 and a reception (Rx) module 1250, 1270 to control transmission and reception of information, data and/or message, and an antenna 1200, 1210 for transmitting and receiving information, data and/or message. Also, each of the user equipment and the base station may include a processor 1220, 1230 for performing the aforementioned embodiments of the present invention and a memory 1280, 1290 for temporarily or continuously storing a processing procedure of the processor. Also, the user equipment and the base station of FIG. 12 may further include one or more of an LTE module for supporting the LTE system and the LTE-A system, and a low power radio frequency (RF)/intermediate frequency (IF) module.

The Tx module and the Rx module included in the user equipment and the base station may perform a packet modulation and demodulation function for data transmission, a quick packet channel coding function, an orthogonal frequency division multiple access (OFDMA) packet scheduling, time division duplex (TDD) packet scheduling and/or channel multiplexing function.

The apparatus described in FIG. 12 is the means for implementing the methods described with reference to FIG. 1 to FIG. 11. The embodiments of the present invention may be performed using the modules and functions of the user equipment and the base station.

The processor of the user equipment may receive a PDCCH signal by monitoring a search space. In particular, the LTE-A user equipment may receive a PDCCH without blocking for a PDCCH signal with another LTE user equipment by performing blind decoding (BD) for an extended CSS.

In the meantime, in the present invention, examples of the user equipment may include a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, and a multi mode-multi band (MM-MB) terminal.

In this case, the smart phone is a terminal provided with advantages of a mobile communication terminal and a personal digital assistant (PDA). The smart phone may mean a terminal in which a schedule management function of the PDA and data communication functions of facsimile transmission/reception, internet access, etc. are integrated on a mobile communication terminal. Also, the multimode-multi-band terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention may be implemented by various means, for example, hardware, firmware, software, or their combination.

If the embodiment according to the present invention is implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. For example, a software code may be stored in the memory unit 1280, 1290 and then may be driven by the processor 1220, 1230. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various wireless access systems. Examples of the various wireless access systems include 3GPP (3rd Generation Partnership Project) system, 3GPP2 and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for detecting a physical downlink control channel (PDCCH) in a wireless access system supporting carrier aggregation, the method comprising:
receiving, by a user equipment (UE), a higher layer signal configuring one or more component carriers including a set of PDCCH candidates that defines search spaces;
monitoring, by the UE, one of the search spaces to decode the PDCCH; and
receiving, by the UE, control information through the PDCCH on the monitored search space,
wherein the search spaces are consecutively configured for the one or more component carriers which have been aggregated,
wherein the monitored search space is differentiated by an offset value related to a carrier indicator field (CIF) value indicating a component carrier configured to the UE, and
wherein the offset value is a result of multiplying a number of the PDCCH candidates and the CIF value.

2. The method according to claim 1, wherein a starting point of the monitored search space is defined based on:

$$Y_K = (A*Y_{k-1}) \bmod D,$$

where $Y_K$ is the starting point, A is 39827, D is 65537, $k=\lfloor n_s/2 \rfloor$ and $n_s$ is a slot number within a radio frame.

3. A method for supporting a detection of a physical downlink control channel (PDCCH) in a wireless access system supporting carrier aggregation, the method comprising:
transmitting, by a base station (BS), a higher layer signal configuring one or more component carriers including a set of PDCCH candidates that defines search spaces; and
transmitting, by the BS, control information through the PDCCH on the one of the search spaces,
wherein the search spaces are consecutively configured for the one or more component carriers which have been aggregated,
wherein the one search space is differentiated by an offset value related to a carrier indicator field (CIF) value indicating a component carrier configured to a user equipment (UE), and
wherein the offset value is a result of multiplying a number of the PDCCH candidates and the CIF value.

4. The method according to claim 3, wherein a starting point of the one search space is defined based on:

$$Y_K = (A*Y_{k-1}) \bmod D,$$

where $Y_K$ is the starting point, A is 39827, D is 65537, $k=\lfloor n_s/2 \rfloor$ and $n_s$ is a slot number within a radio frame.

5. A user equipment (UE) for detecting a physical downlink control channel (PDCCH) in a wireless access system supporting carrier aggregation, the UE comprising:
a reception module; and
a processor operably coupled to the reception module, wherein the processor is configured to:
receive, via the reception module, a higher layer signal configuring one or more component carriers including a set of PDCCH candidates that defines search spaces;
monitor one of the search spaces to decode the PDCCH; and
receive, via the reception module, control information through the PDCCH on the monitored search space,
wherein the search spaces are consecutively configured for the one or more component carriers which have been aggregated,
wherein the monitored search space is differentiated by an offset value related to a carrier indicator field (CIF) value indicating a component carrier configured to the UE, and
wherein the offset value is a result of multiplying a number of the PDCCH candidates and the CIF value.

6. The UE according to claim 5, wherein a starting point of the monitored search space is defined based on:

$$Y_K = (A*Y_{k-1}) \bmod D,$$

where $Y_K$ is the starting point, A is 39827, D is 65537, $k=\lfloor n_s/2 \rfloor$ and $n_s$ is a slot number within a radio frame.

7. A base station (BS) for supporting a detection of a physical downlink control channel (PDCCH) in a wireless access system supporting carrier aggregation, the BS comprising:
a transmission module; and
a processor operably coupled to the transmission module, wherein the processor is configured to:
transmit, via the transmission module, a higher layer signal configuring one or more component carriers including a set of PDCCH candidates that defines search spaces, and
transmit, via the transmission module, control information through the PDCCH on one of the search spaces,
wherein the search spaces are consecutively configured for the one or more component carriers which have been aggregated,
wherein the one search space is differentiated by an offset value related to a carrier indicator field (CIF) value indicating a component carrier configured to a user equipment (UE), and
wherein the offset value is a result of multiplying a number of the PDCCH candidates and the CIF value.

8. The BS according to claim 7, wherein a starting point of the one search space is defined based on:

$$Y_K = (A*Y_{k-1}) \bmod D,$$

where $Y_K$ is the starting point, A is 39827, D is 65537, $k=\lfloor n_s/2 \rfloor$ and $n_s$ is a slot number within a radio frame.

* * * * *